Patented Sept. 14, 1943

2,329,619

UNITED STATES PATENT OFFICE 2,329,619

μ-SUBSTITUTED OXAZOLINES, μ-SUBSTITUTED PENTOXAZOLINES, AND METHODS FOR THEIR PREPARATION

David Walker Jayne, Jr., Old Greenwich, and Harold Milton Day, Cos Cob, Conn., assignors to American Cyanamid Company, New York, N. Y., a corporation of Maine No Drawing. Application September 4, 1941, Serial No. 409,532

12 Claims. (Cl. 260—244)

This invention relates to the manufacture of heterocyclic compounds and more particularly relates to μ-substituted oxazolines and μ-substituted pentoxazolines.

It is an advantage of the present invention that a new class of substituted oxazolines and substituted pentoxazolines are provided which have a wide field of usefulness in the commercial arts. Another advantage of the present invention is that a process of producing the above compounds is provided which is easily carried out and uniformly results in excellent yields. Many further advantages will become apparent to those skilled in the art from the detailed description following hereafter.

The substituted oxazolines and pentoxazolines produced in accordance with the present invention may be represented by the following general formulae:

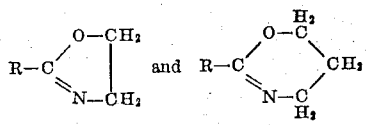

Formula 1 above represents a μ-substituted oxazoline in which R stands for an alkyl radical having from 8 to 20 carbon atoms. In some instances the hydrogens on the alpha and beta carbon atoms may be replaced by alkyl, aralkyl, aryl, cycloaliphatic, or similar radicals. Formula 2 represents a μ-substituted pentoxazoline in which R is the same as in Formula 1, that is to say an alkyl radical having from 8 to 20 carbon atoms. In some instances the hydrogens on the alpha, beta and gamma carbon atoms may be replaced by alkyl, aralkyl, aryl, cycloaliphatic, or similar radicals. The compounds are in general form yellow, soft, waxy materials, the salts of which are completely soluble in water to give "soapy" solutions which have wetting-out, emulsifying and dispersing properties.

In general we have found that the compounds may be prepared by three methods. The invention, however, should not be limited to these three particular methods and it is contemplated that equivalent products produced by other methods will come within the scope of the invention.

The three general methods which we have found satisfactory for preparing our reagents, briefly outlined, are as follows:

A. By heating approximately equimolecular proportions of an organic sulfonic acid salt of a 1:2 or 1:3 alkylolamine and a fatty acid (or a mixture of fatty acids) to a temperature of about 270° C. with the removal of water. The reaction which probably takes place may be illustrated by the following equations between an aromatic sulfonic acid salt of monoethanolamine and a fatty acid.

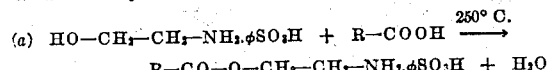

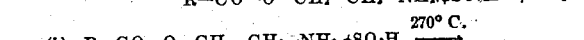

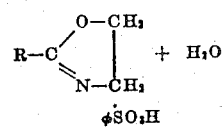

In the above equations R represents an alkyl radical of a long chain fatty acid. φ represents an aromatic radical such as benzene or naphthalene. The above reaction in all probability proceeds in two steps as illustrated, that is to say, at about 250° C. one molecule of water is split out and an ester of the aromatic sulfonic acid salt of monoethanolamine is obtained. Upon further heating to about 270° C. another molecule of water is split out, a ring closure takes place and an oxazoline is probably obtained.

B. The second method which may be employed for producing our reagents, comprises heating a mixture of an aromatic sulfonic acid, a 1:2 or 1:3 alkylolamine and a fatty acid (or a mixture of fatty acid) at a temperature above 250° C., preferably about 270° C. For example, when benzene sulfonic acid, monoethanolamine and myristic acid are mixed together, the sulfonic acid being a stronger acid than the myristic acid will preferentially form the monoethanolamine salt and subsequent heating of the mixture results in the production of compounds which are probably identical with those produced by Process A.

C. The third method comprises heating a mixture of an organic sulfonic acid and the 1:2 or 1:3 alkylolamide of a fatty acid, or a mixture of fatty acids to about 270° C. with the removal of water. The reaction which takes place may be illustrated by the following equation between an aromatic sulfonic acid and the monoethanolamine of a fatty acid.

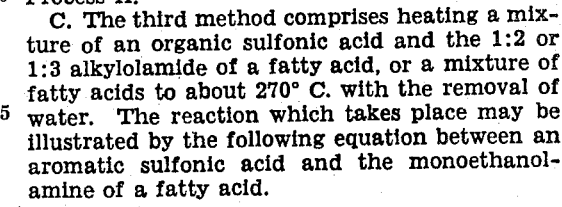

When this process is employed, the alkylolamide of the fatty acid may be produced by reacting a primary or secondary alkylolamine with a fatty acid chloride, a glyceride or a fatty acid, or the like. Under certain conditions, dehydration may be effected at much lower temperatures, for example, if the reaction mixture is refluxed in toluene with the removal of the water of reaction.

While the compounds of the present invention are most probably oxazolines, we do not desire to limit the invention by such a positive designation and prefer therefore to broadly include any or all products produced by the reaction of either aliphatic or aromatic sulfonic acid salts of alkylolamine with higher fatty acids, or a mixture of an aromatic sulfonic acid, an alkylolamine and a higher fatty acid, or a mixture of an alkylolamide of a higher fatty acid and an aromatic sulfonic acid, at temperatures above 250° C.

The following examples are illustrative of methods which have been found suitable for preparing representative members of the compounds which are disclosed herein.

A. BY HEATING AN AROMATIC SULFONIC ACID SALT OR A 1:2 OR 1:3 ALKYLOLAMINE AND A HIGHER FATTY ACID TO 270° C. WITH THE REMOVAL OF WATER

*Example 1a*

A mixture of 218 grams (1 mol) of anhydrous benzene sulfonic acid salt of monoethanolamine and 214 grams (1 mol) of coconut oil fatty acids were heated to 270° C. in a short-neck flask fitted with a distilling condenser. 36 grams (2 mols) of water was collected as the distillate. The product was a waxy material, soluble in water to give a "foamy" solution.

*Example 2a*

Same procedure as Example 1a using 234 grams (1 mol) of anhydrous p-toluene sulfonic acid salt of monoethanolamine and 214 grams (1 mol) of coconut oil fatty acids. Again 36 grams (2 mols) of water was obtained and the product was similar to that obtained in Example 1a.

*Example 3a*

Same procedure as Example 1a using 234 grams (1 mol) of anhydrous p-toluene sulfonic acid salt of monoethanolamine and 282 grams (1 mol) of oleic acid. Again 36 grams (2 mols) of water was obtained. The product was a dark colored waxy material, sparingly soluble in water to give a "foamy" solution.

B. BY HEATING A MIXTURE OF AN AROMATIC ACID, A 1:2 OR 1:3 ALKYLOLAMINE AND A FATTY ACID TO 270° C. WITH THE REMOVAL OF WATER

*Example 1b*

A mixture made up of 214 grams (1 mol) of coconut oil fatty acids, 61 grams (1 mol) of monoethanolamine and 190 grams (1 mol) of p-toluene sulfonic acid monohydrate was heated to 270° C. in a short-neck flask fitted with a distilling condenser. About 54 grams (3 mols) of water was collected as the distillate, 2 molecules of the water being split out in the course of the reaction, the third molecule being left present in the p-toluene sulfonic acid monohydrate. The product obtained was a waxy material, soluble in water to give a foamy solution and otherwise identical to the product obtained in Example 1a.

C. BY HEATING A MIXTURE OF AROMATIC SULFONIC ACID AND THE 1:2 OR 1:3 ALKYLOLAMIDE OF A FATTY ACID TO 270° C. WITH THE REMOVAL OF WATER

*Example 1c*

A mixture of 330 grams (1 mol) of ethanolstearamide and 190 grams (1 mol) of p-toluene sulfonic acid monohydrate was heated to 270° C. in a short-neck flask fitted with a distilling condenser. 36 grams (2 mols) of water was collected as a distillate (1 mol from the water of crystallization in the sulfonic acid and 1 mol from the reaction). The product was a wax, sparingly soluble in water to give a "foamy" solution.

*Example 2c*

Same procedure as Example 1c using 347 grams (1 mol) of the crude ethanolamide of cottonseed oil fatty acids (made by heating 286 grams of cottonseed oil and 61 grams of monoethanolamine to 210° C.) and 190 grams (1 mol) of p-toluene sulfonic acid monohydrate. Again 36 grams (2 mols) of water was obtained and the product was quite similar to that obtained in Example 1a.

It is not necessary to use a full mol of the sulfonic acid per mol of amide to obtain the oxazoline. The use for instance of ½ mol of sulfonic acid per mol of amide will yield a mixture of equal parts oxazoline salt and free oxazoline.

Other carboxylic acids which may be used in place of all or part of the fatty acid in the above examples, are capric, palmitic, stearic, oleic, abietic, montanic, naphthenic acids, talloel acids, mixtures of such acids and especially mixtures of acids obtainable by saponification from coconut oil, palm kernel oil, cottonseed oil, or from any of the various other vegetable or animal oils and fats.

Likewise, various other organic sulfonic acid salts of amino alcohols may be used in place of all or part of p-toluene sulfonic acid salt of monoethanolamine in the above example, and the invention is not limited to those of a particular series. Thus, for example, in addition to the common aromatic sulfonic acid of the benzene series employed in the example, those of diphenyl, naphthalene, anthracene, phenanthrene series may be used. The aliphatic sulfonic acids may likewise be employed such as those of paraffin hydrocarbons of 12–18 carbon atoms in length, ligninsulfonic acid, guanyl urea sulfonic acid, dodecyl sulfonic acid, and the like, also compounds such as toluene thiosulfonic acid.

It will be noted that the products obtained by either method are sulfonic acid salts of oxazolines. The free oxazolines may be obtained by appropriate treatment of the salt with a strong alkali. Other salts, such as the acetic, hydrochloride, etc., may then be obtained from the oxazoline by treatment with the appropriate acid, or quaternary salts by treatment with an alkylating agent such as an alkyl, or aralkyl halide, di-alkyl sulfates, and the like.

In place of monoethanolamine any 1:2 monohydroxy monoamino alkylolamine may be used to obtain an α or β-substituted oxazoline. Or a 1:3 alkylolamine may be used to obtain a μ-alkyl pentoxazoline, such as:

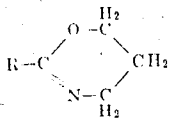

The 1:2 and 1:3-alkylolamines mentioned above refer to alkylolamines having at least one hydroxy group and at least one primary amino group located in the 1:2 or the 1:3 positions.

Structurally suitable 1:3-alkylolamines may be represented as follows:

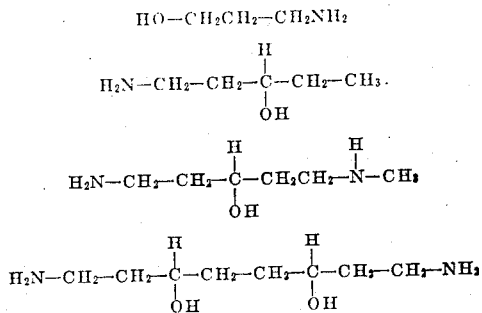

Suitable 1:2-alkylolamines are structurally similar to the 1:3-alkylolamines, the only difference being that the hydroxyl and the primary amino groups are in the 1:2-positions as follows:

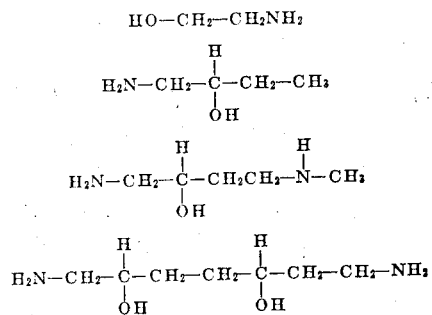

In the above formulae it is readily seen that the only essential groupings are the hydroxyl group and a primary amino group situated in either the 1:2-positions or the 1:3-positions. In addition to these essential groupings the alkylolamines may have additional groupings present. These additional groupings may be a simple alkylene chain or they may be an alkylene chain containing hydroxy groups as well as secondary or tertiary amino groups. In some cases suitable alkylolamines may contain a plurality of groups having a hydroxy group and a primary amino group in either the 1:2 or the 1:3-positions, said groups being separated from one another by an alkylene chain. In this type of alkylolamine it may be possible to utilize those having one group made up of 1:2-hydroxy primary amino group separated by an alkylene chain from a group having a hydroxyl and a primary amino group in the 1:3-positions. In these latter types of alkylolamines it may be possible to produce compounds having a plurality of oxazoline rings or a compound having an oxazoline ring and a pentoxazoline ring.

Monoethanolamine is the preferred alkylolamine because of its cheapness and ready availability. It should be distinctly understood, however, that the monoethanolamine may be replaced in all or part by other primary alkylolamines and products obtained having valuable silica promoting properties. Representative alkylolamines include those such as: monoisopropanolamine, mono-n-propanolamine, 2-amino-1-butanol, 2-amino-2-methyl propanol, 2-amino-1-hexanol, 2-amino-2-methyl 1,3-propanediol, 2-amino-1-butanol, and the like.

These aromatic sulfonic acid salts of oxazolines (prepared according to the foregoing examples) may be distinguished from the aromatic sulfonic acid salts of monoethanolamine esters of fatty acids (prepared by Method A, but heating to not over 250° C.) by the fact that they are not decomposed by heating with aqueous solutions of strong alkalies, whereas with similar treatment the ester salts are hydrolyzed to soaps.

We claim:

1. A compound of the group consisting of those represented by the following formula:

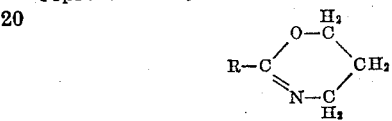

in which R represents an alkyl radical having from 8 to 20 carbon atoms, and salts thereof.

2. The process of producing heterocyclic compounds which comprises heating an aromatic sulfonic acid salt of a compound of the group consisting of alkylolamines having a hydroxy group and a primary amino group in the 1:2 positions and alkylolamines having a hydroxy group and a primary amino group in the 1:3 positions with a higher fatty acid acylating agent at a temperature above 250° C.

3. The process of producing oxazoline which comprises heating an aromatic sulfonic acid salt of an alkylolamine having a hydroxy group and a primary amino group in the 1:2 positions with a higher fatty acid acylating agent at a temperature above 250° C.

4. The process of producing pentoxazolines which comprises heating an aromatic sulfonic acid salt of an alkylolamine having a hydroxy group and a primary amino group in the 1:3 positions with a higher fatty acid acylating agent at a temperature above 250° C.

5. The process of producing an oxazoline which comprises heating an aromatic sulfonic acid salt of monoethanolamine with a higher fatty acid at a temperature above 250° C.

6. The process of producing an oxazoline which comprises heating an aromatic sulfonic acid salt of monoethanolamine with coconut oil fatty acids at a temperature above 250° C.

7. The process of producing an oxazoline which comprises heating the benzene sulfonic acid salt of monoethanolamine with coconut oil fatty acids at a temperature above 250° C.

8. The process of producing an oxazoline which comprises heating the p-toluene sulfonic acid salt of monoethanolamine with coconut oil fatty acids at a temperature above 250° C.

9. An oxazoline salt of the group consisting of those represented by the following general formula:

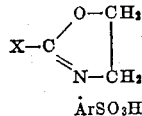

in which X is the alkyl radical of coconut oil fatty acids and Ar is an aromatic radical of the group consisting of benzene and naphthalene.

10. An oxazoline having the following formula:

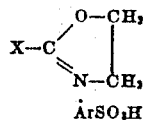

in which X is the alkyl radical of coconut oil fatty acids and Ar represents benzene.

11. An oxazoline having the following formula:

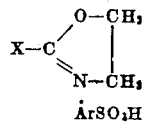

in which X is the alkyl radical of coconut oil fatty acids and Ar represents naphthalene.

12. A compound of the group consisting of those represented by the following formula:

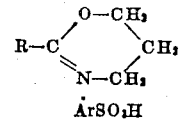

and

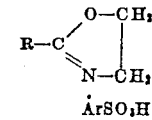

in which R represents an alkyl radical having from 8 to 20 carbon atoms and Ar is an aromatic radical of the group consisting of benzene and naphthalene.

DAVID WALKER JAYNE, Jr.
HAROLD MILTON DAY.